Figure 1:
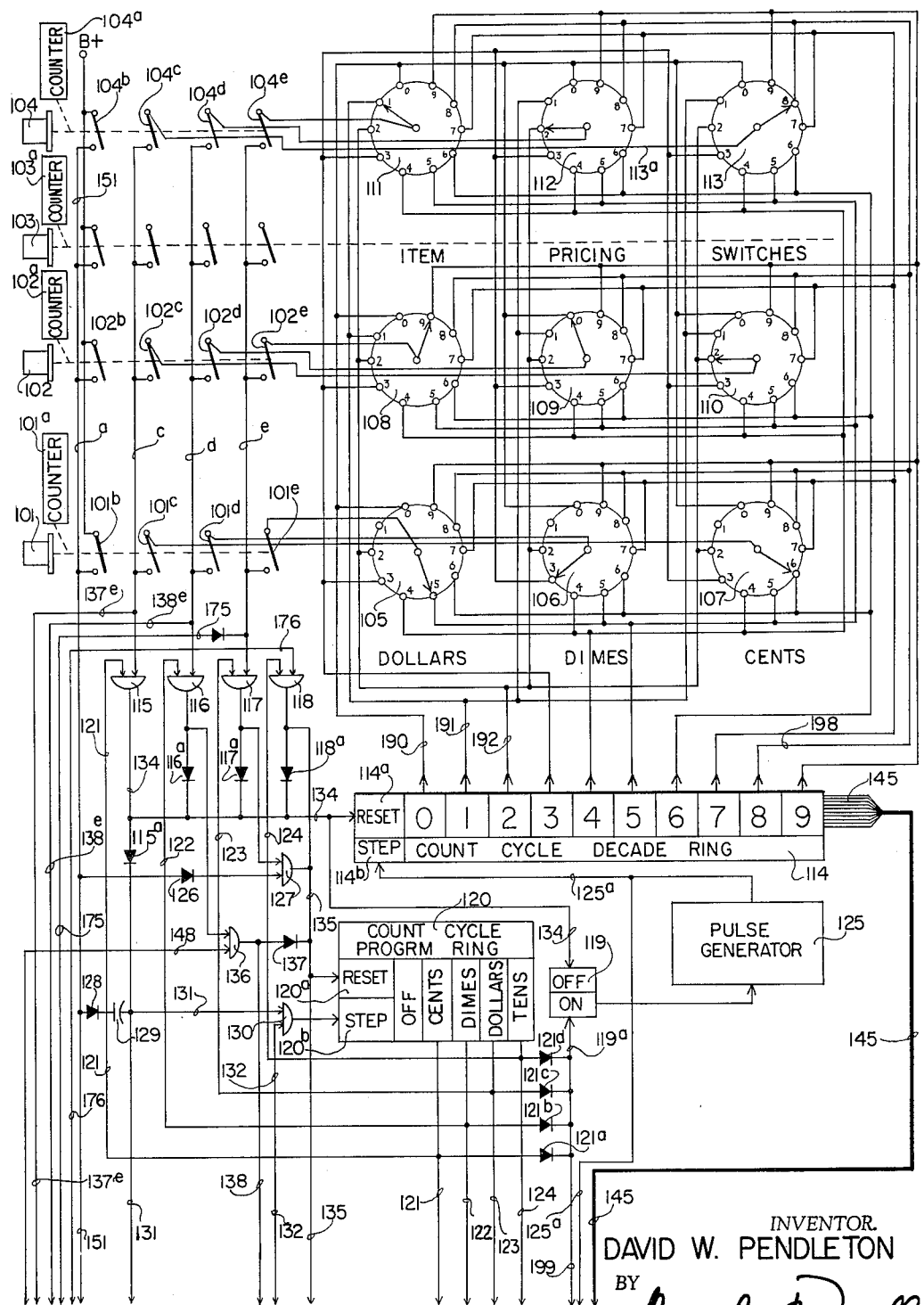

May 24, 1966 D. W. PENDLETON 3,253,132
REGISTER SYSTEM
Filed Nov. 1, 1962 4 Sheets-Sheet 1

INVENTOR.
DAVID W. PENDLETON
BY
Alexander & Dowell
ATTORNEYS

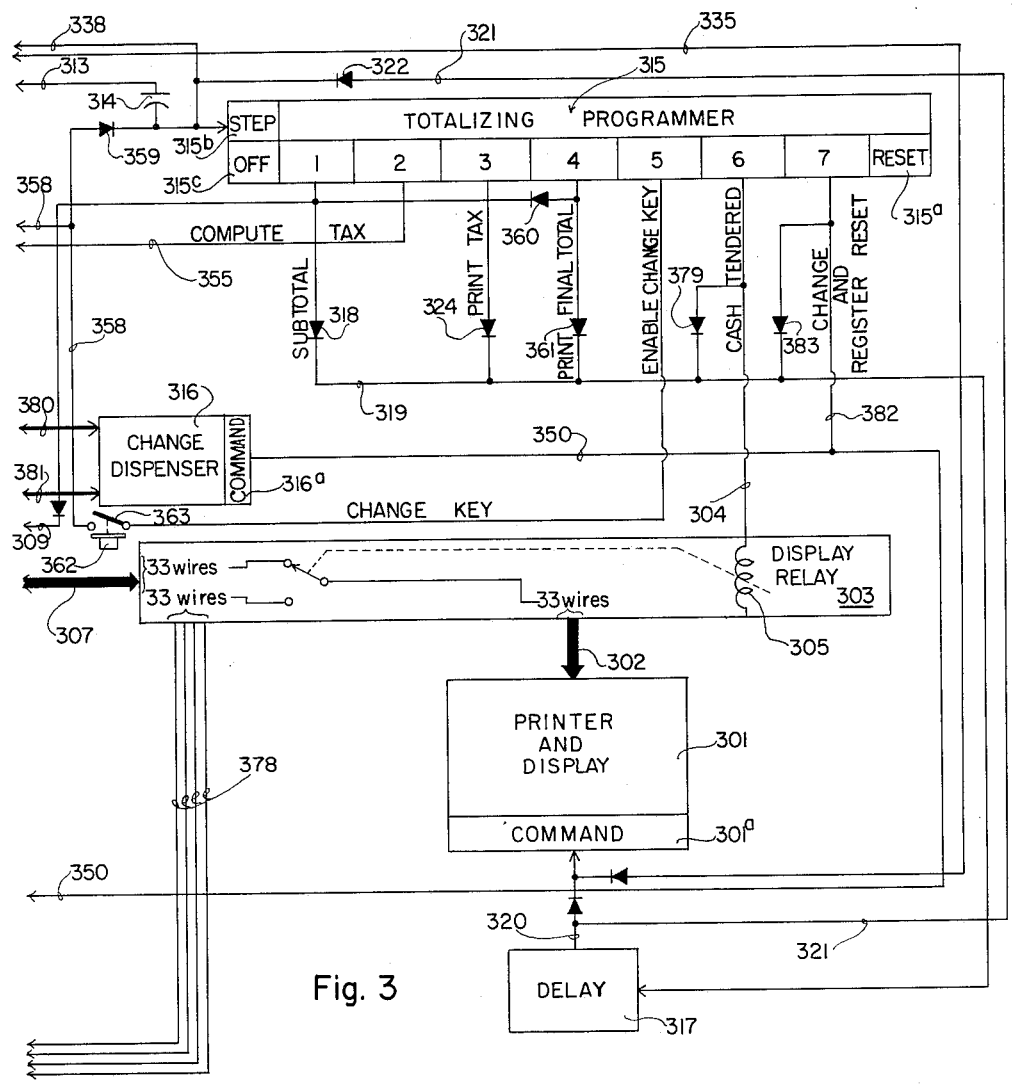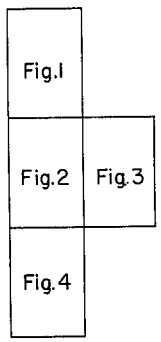

United States Patent Office 3,253,132
Patented May 24, 1966

3,253,132
REGISTER SYSTEM
David W. Pendleton, Alexandria, Va., assignor to American Machine & Foundry Co., a corporation of New York
Filed Nov. 1, 1962, Ser. No. 234,593
14 Claims. (Cl. 235—168)

This invention relates to electronic register systems, and particularly to electronic sales registers which automatically price the items being sold, calculate the total of the sale, the tax on that total, and the total of the items plus the tax, and which also enter the amount of money tendered and automatically calculate and display the change due.

It is the principal object of this invention to provide a novel sales register and inventory control system having all of the practical advantages which are obtained in connection with other prior art systems employing solid-state semiconductor circuits instead of mechanical mechanisms, these advantages including compactness, speed of operation, long life, low maintenance, flexibility of design and function obtainable by electrically connecting different combinations of modular units, and ease of adaptability to the various tax structures of different states by merely changing a unitized wired or printed circuit board. The present system is particularly well adapted for use with solid-state electronic circuits, the reliability of which is much greater than that of vacuum tube circuitry.

It is a major object of this invention to provide a new and improved combination of several number-receiving registers into which numbers are entered from an item keyboard through a plurality of preset item pricing switches, the adjustment of which determines the amount entered in the register each time the operator presses an item key. Furthermore, the registers receive numbers from a tax computing circuit and finally from a cash keyboard on which the operator enters the amount of money tendered by the customer.

The present novel system includes a plurality of gates controlling the flow of pulses from a pulse generator, these gates being controlled by several sequential counter rings which program the sequence in which the various gates are enabled so as to direct the pulses from the pulse generator through specific routes in the system and eventually into the registers and into the printer and display means and the automatic change dispenser. The present system, set in motion when an item pricing key is depressed, functions substantially entirely on a decade digital basis in which the cents digit of a selected group of item pricing switches is first scanned to find coincidence with the decade position energized at the moment, the dimes digit is next scanned for coincidence, then the dollars digit and finally the tens and/or higher digits are scanned. In each digit there is a decade position which is connected by switching and gating means to one of the registers. The pulse generator steps a count cycle decade ring which is counted upwardly until that decade position is reached, and when coincidence is found between an output of the count cycle decade ring and that decade position, the pulse generator is automatically stopped and switched to begin counting again in the next higher decade in search of the particular decimal position in which coincidence is found.

It is an important object of this invention to provide a system in which the successive scanning of the switch positions in the various digits can be conducted at very high speed and with the minimum number of components which are required in order to enter those numbers into the register which are established by finding coincidence in the successive digits.

Another object of this invention is to provide a system employing two different registers into which numbers are entered and which are interconnected and controlled in such a way that the inputs to the registers are all connected and pulsed in parallel with each other in the corresponding digits of the separate registers, and in which different numerical readings in the separate registers are obtained by selectively resetting one or the other of the registers to zero at times without resetting the other register. All transferring and remembering of numbers is accomplished by this novel sequential handling of the two registers, and the outputs of these registers are periodically connected to printer and display means in a novel sequence which enables the printer and display means to successively indicate the price of each item as the corresponding item key is depressed on the keyboard, the sub-total of these prices, tax on this sub-total, the total bill, the cash tendered, and the change due the customer. Moreover, all of these functions are accomplished without requiring the use of reversible registers, all counting being accomplished in the direction of increasing numerical values by unidirectional decade counters in the various register digits.

Other objects and advantages of the present invention will become apparent during the following discussion of the drawings, wherein:

FIGS. 1, 2, 3, and 4, when mutually associated, illustrate schematically one practical embodiment of the invention; and FIG. 5 is a block diagram showing the manner in which FIGS. 1 through 4 should be associated in order to make a complete schematic diagram.

Figure 2:
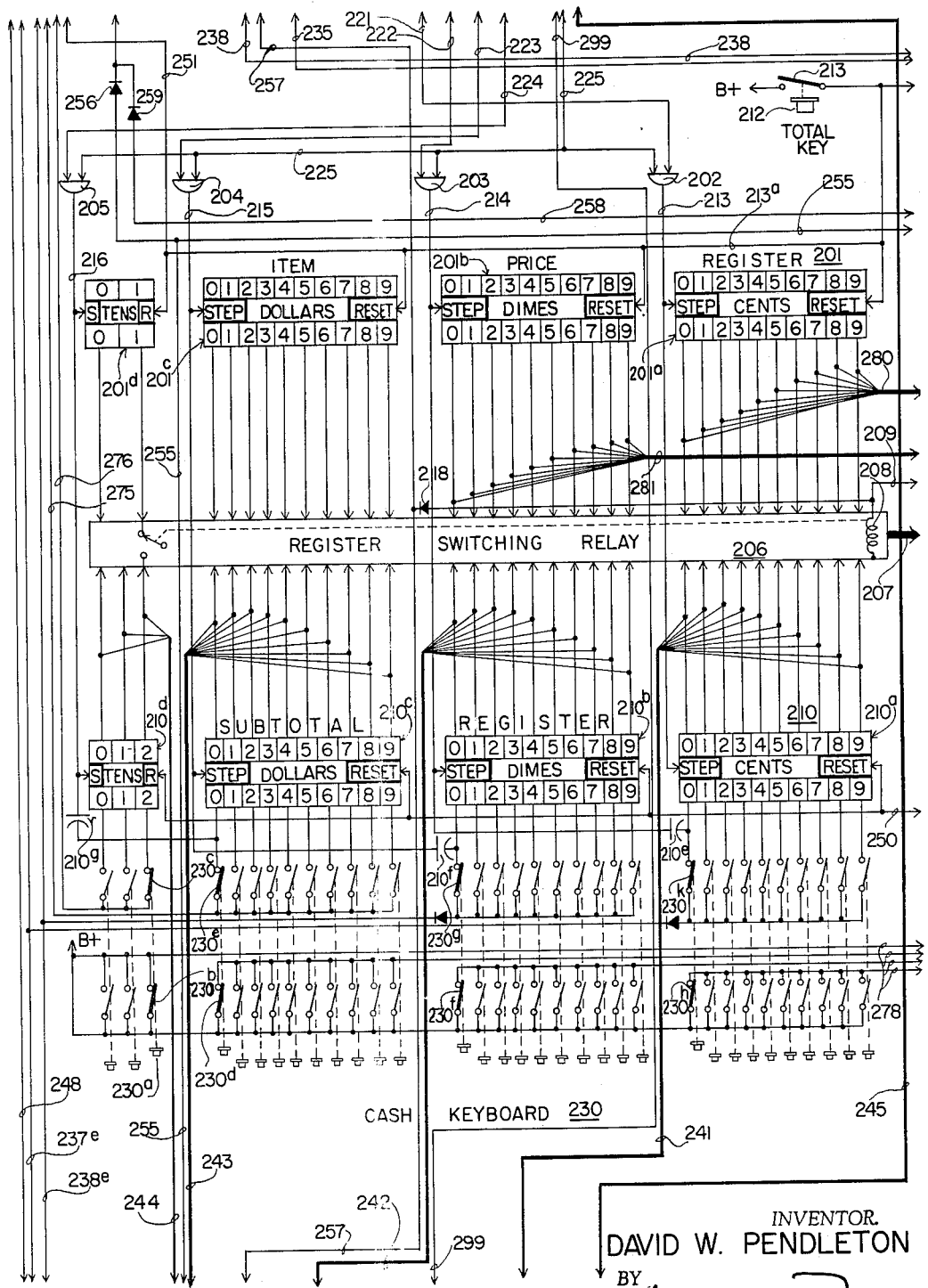

Referring now to FIGS. 1 through 4, the illustrated embodiment of the present invention includes two registers located in FIG. 2 and connected to receive various digital entries from two different keyboards serving the system. An item entering and pricing keyboard is located near the top of FIG. 1 and shows four different keys 101, 102, 103, and 104, each one of which is connected with a group of preset switches which function to price an item represented by an individual key. In the illustrated embodiment, when key 101 is depressed, the item pricing switches, in the group 105, 106, 107 connected therewith, enter the number 536 in both registers, this number representing a price of $5.36 corresponding with a particular item represented by key 101. Each of these keys is also connected with a counter 101a, 102a, 103a, and 104a which counts the number of times that key is depressed and thereby provides means for use in connection with inventory control. The item pricing switches connected with the vairous keys 101-104 are respectively labeled 105, 106, 107, 108, 109, 110, 111, 112 and 113. As many keys of this item keyboard can be provided as there are inventory items to be sold or accounted for. Item key 103 is not connected with any pricing switches, but is merely included to illustrate the fact that more keys and item pricing switches are intended than are illustrated in FIG. 1. Each of the item keys 101-104 closes four single throw switches, three of which are connected with the wipers of the item pricing switches, and the fourth switch on each item key is connected with a busbar labeled $a$ which serves as a command device for energizing a system of counting rings and programmers whenever a key is depressed. This feature will be more fully described hereinafter. Referring to the switches connected with key 101, it will be seen that the switch 101$b$ is connected with the command circuit busbar $a$ which controls the counters; that switch 101$c$ is connected with the wiper of the item pricing switch 107 and the busbar $c$ in the cents column; that switch 101$d$ is connected with the wiper of the item pricing switch 106 and with the busbar $d$ in the dimes column; and that switch 101$e$ is connected with the wiper of the item pricing switch 105 and with busbar *e* in the dollars column. The other switches associated with the other keys 102 and 104 are similarly labeled and connected to perform functions similar to these switches associated with the key 101.

All of the decade switch positions of the item pricing switches representing similar numerical values are connected in parallel and connected with the respective outputs of a count cycle decade ring 114, this ring having a reset terminal 114*a*, a stepping terminal 114*b* and ten outputs labeled 0 through 9. The output zero of the count cycle decade ring 114 is connected with the zero terminal of every one of the item pricing switches 105–113. Likewise, the number 1 terminal of the count cycle decade ring 114 is connected with all of the number 1 positions of the item pricing switches 105–113. In like manner, the other output terminals 2 through 9, inclusive, of the count cycle decade ring 114 are connected with the positions 2 through 9 of all of the item pricing switches. In this manner, whenever the count cycle decade ring 114 is stepped thorugh its outputs zero through 9, the corresponding positions of all of the item pricing switches are simultaneously energized since they are all connected respectively in parallel.

Although the corresponding positions of all of the item pricing switches are simultaneously energized in sequence, only one of these positions in one group of pricing switches passes current. For instance, if the key 102 is depressed, only the group of item pricing switches, 108, 109, 110, can pass current, and this current must be passed respectively through the switches 102*c*, 102*d*, or 102*e*. Although all three of these switches are closed whenever the key 102 is pressed, only one of these switches at a time can actually conduct current and the selection therefore in the cents column, the dimes column or the dollars column, is made by one of the gates 115, 116, or 117 which respectively control the flow of current in the bus wires labeled *c, d,* and *e* leading to these gates. These are "and" gates, meaning that both of the inputs have to be energized before the gate has any output. Thus, if the key 102 is pressed, the inputs from the pricing switch wipers along the wires *c, d,* and *e* will all be connected, but only one of the gates 115, 116 or 117 will be energized at both of its input terminals. The selection of which gate is enabled is made by the count cycle program ring 120 which has four different outputs 121, 122, 123, and 124. These outputs connect respectively with one of the inputs to gates 115, 116, 117, and 118 and enable only one of those gates depending on which of the four outputs of the count cycle program ring is energized at the instant. The count cycle program ring 120 includes also a reset input 120*a* and a stepping input 120*b*, and is controlled through these inputs in a manner to be hereinafter explained. Whenever an output appears at one of the terminals 121, 122, 123, or 124 of the count cycle program ring 120 a bistable flip-flop switch 119 is turned "on" by current flowing through the appropriate one of the diodes 121*a*, 121*b*, 121*c*, or 121*d*. When this terminal is "on" it turns on a pulse generator 125 which then delivers pulses along the wire 125*a* which leads to the stepping terminal 114*b* of the count cycle decade ring and causes it to step forwardly by one decade position for each pulse applied to the ring 114 by the pulse generator 125. On the other hand, if an input is delivered to the "off" terminal of the flip-flop 119 through the wire 134 the flip-flop is turned "off" and the flow of pulses from the pulse generator is immediately stopped thereby leaving the count cycle decade ring 114 in whatever position it last occupied. FIG. 1 contains additional command and control circuitry which will be described hereinafter in connection with its intended function.

Referring now to FIG. 2, this figure includes the item price register 201 and the subtotal register 210, and each of these registers comprises a plurality of decimal ring counters, one counter for each digit. Only four digits are shown in the present illustrative embodiment. Each of the ring counters has a stepping terminal and a reset terminal. In the present embodiment the item price register 201 includes a cents counter 201*a*, a dimes counter 201*b*, a dollars counter 201*c*, and each of these counters has ten decimal positions labeled 0 through 9, inclusive. The item price register 201 also includes a tens-of-dollars counter 201*d* having a stepping terminal labeled S and a reset terminal labeled R and two digital positions 0 and 1. Thus, the maximum price of any item which can be read into the item price register is $19.99, and this capacity is deemed adequate for use in connection with cafeterias and other sales functions involving relatively low-priced items.

The subtotal register 210 is somewhat different and has a somewhat greater capacity. This register includes a cents counter ring 210*a*, a dimes counter 210*b* and a dollars counter 210*c*, all of which have ten positions 0 through 9. The register 210 further includes a tens-of-dollars counter 210*d* having the positions 0, 1 and 2, so that the maximum number that can be stored in this register is $29.99.

Each of the counting rings 201*a* through 201*d* in the item price register 201, and 210*a* through 210*d* in the subtotal register 210 is intended to be stepped in its forward direction by pulses emanating from the gated pulse generator 125, when it is turned on by the flip-flop 119, and these pulses traveling downwardly through the wires 125*a* and 225 to pulse the gates 202, 203, 204, and 205. These pulses arriving at these four gates along the wire 225 cannot pass through any of the gates unless the other input terminal to that gate is energized by the count cycle program ring 120 via the wires 221, 222, 223 and 224. When this program ring 120 is energized in the cents position, an output is had along wire 121 and wire 221 to enable the gate 202 so that pulses from the pulse generator 125 and the wire 225 can then pass through the gate 202 and into the stepping terminals of the cents register counter 201*a* and also into the cents register counter 210*a*, thereby stepping both of these counters. In like manner, an output from the count cycle program ring 120 in the dimes position along wires 122 and 222 will enable the gate 203. An output along the dollars wire 123 and 223 will enable the gate 204 in the dollars column, or an output along the wire 124 and 224 will enable the gate 205 in the tens-of-dollars column, thereby admitting pulses to the tens counter 201*d* and 210*d*. It will subsequently appear that except during the entry of a first item by pressing one of the item keys 101–104, the amounts contained in the item price register 201 and in the subtotal register 210 are not necessarily the same, although both registers simultaneously receive all pulses entered in either register.

It will be desirable from time to time to display or print the amount entered in the item price register 201 to the exclusion of the amount entered in the subtotal register 210. Conversely, at times it is desirable to print or display the amount contained in the subtotal register 210 to the exclusion of the amount appearing in the item price register 201. Thus it is necessary that the outputs from each of these registers be obtainable while leaving the outputs of the other register undisturbed, and for this purpose a register switching relay 206 is provided, this relay including double-throw 33-terminal contacts such that in normal position it selects the outputs of the item price register 201 and delivers these outputs along 33 wires at cable 207, which cable passes into FIG. 3 wherein it is labeled 307 and is used for printing and display purposes, as will be hereinafter explained. The register switching relay 206 includes a relay winding 208 which when energized by the wire 209 causes the relay to switch into its lower position wherein the outputs from the register 210 are connected to the cable 207 and delivered through cable 307 to the printing and display means 301. FIG. 2 also includes a total key 212 which is connected to operate a switch 213, which when closed indicates to the system that the operator has entered all of the items purchased on the item keyboard 101–104 and that the system is ready to proceed with the subtotaling and tax function as will be described hereinafter.

At the bottom of FIG. 2 there is a second keyboard referred to as the cash keyboard 230. This keyboard includes 33 keys by which amounts up to $29.99 can be entered in the system. Each of the keys of the cash keyboard 230 is connected with several switches one of which in each decimal position is connected with a corresponding decimal position of the subtotal register 210. It is the purpose of this keyboard to enter into the system amounts corresponding with the particular key depressed in each decade denomination, the rightmost bank of ten keys being connected to the cents counter, and the other banks of keys being respectively connected with the dimes counter; the dollars counter and the tens-of-dollars counter. The details of these connections and their functions will be more fully described hereinafter.

FIG. 3 includes a printer and display device 301 which may be of any suitable type, and which must be capable of displaying four digits corresponding with the cents, dimes, dollars, and tens digits of the two registers 201 and 210. Actually, this printer can be a standard paper-tape printer capable of printing four digits, and may include additional display means, such as Nixie tube displays or even mechanical counter display means. At any rate, the printer 301 is connected by a cable 302 including 33 wires coming from a display relay 303 which comprises a 33-pole double-throw relay having a normal position in which the gate 302 is connected with the cable 307 coming from the register switching relay 206. However, when the wire 304 is energized the winding 305 of the relay 303 is energized so that it throws the relay into the other position in which it connects with the cable 378–278 coming from the cash keyboard 230 and connects these 33 wires respectively with the 33 wires in the cable 302. Thus, when the winding 305 of the relay is non-energized, the printer receives inputs from the register switching relay 206, and when the winding 305 is energized, the printer 301 receives inputs from the cash keyboard 230 in the manner to be hereinafter described in detail. When all of the items have been entered on the item keys 101–104, and the operator signifies this fact to the system by depressing the total key 212 and closing the switch 213, a pulse is sent from a source of voltage labeled B+ through the switch 213 and to the wire 313, through the condenser 314 and into the stepping terminal 315b of a totalizing programmer 315. This totalizing programmer has an initial or "off" position followed by seven different outputs, and a reset terminal 315a which when energized resets the totalizing programmer to the "off" position 315c. The command outputs of the programmer are labeled 1, 2, 3, 4, 5, 6, and 7, and it is to be noted that terminal 5 actually comprises a stop or break in the automatic sequence of functions to be hereinafter explained.

The totalizing programmer 315 controls the functions of the register-switching relay 206, thereby controlling the input to the printer and display system which is generally referred to by the reference numeral 301. The programmer 315 also controls certain functions of the count cycle program ring 120; the printing of the tax amounts; the printing of the final total of items-purchased plus tax; the display relay 303 which determines whether the outputs from a register are displayed, or a cash-tendered amount is displayed as entered on the cash keyboard 230. In addition the totalizing programmer controls the change dispenser 316. The control of the print and display unit 301 by the totalizing programmer 315 is accomplished through a delay circuit 317 which causes the print and display unit 301 to pause before performing its function so as to give the mechanical register-switching relay 206 and the display relay 303 sufficient time to operate so that the printer displays the correct data after the correct data has been channeled to it.

Figure 4:
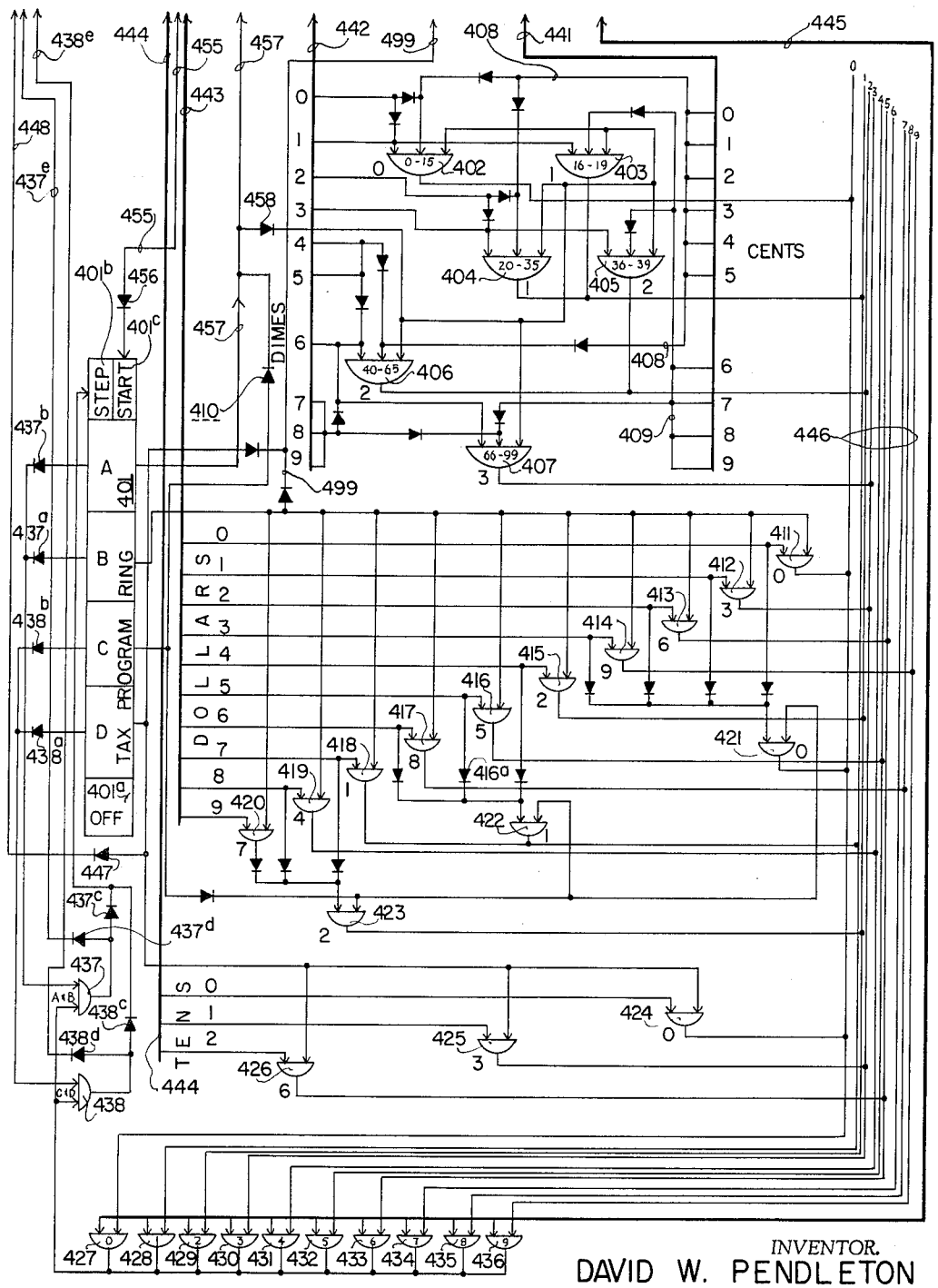

FIG. 4 shows the tax computer which is controlled by four separate cables of wires extending downwardly from the output of the subtotal register 210. The output of the cents register 210a extends downwardly along the cable 241 which joins cable 441 in FIG. 4; the output of the dimes register 210b extends downwardly through cable 242 which joins cable 442 in FIG. 4; the output of the dollars register 210c extends downwardly through cable 243 which joins cable 443 in FIG. 4; and the output of the tens register 210d extends downwardly through cable 242 which joins cable 442 in FIG. 4; the output of the 442, and 443 have ten wires each, whereas cable 444 has only three wires representing three of the decimal positions 0, 1 and 2. A total of thirty-three wires therefore comes from the subtotal register down into the tax computer and these wires are coupled to four series of gates which serve to calculate the tax due depending upon which ones of the thirty-three wires are energized. The functions of these series of tax gates will be more fully described hereinafter, when the computation of actual examples is described, but in general the functions of these various gates are controlled by a tax program ring 401 which comprises a ring counter having a step terminal 401b, a start terminal 401c, and an "off" terminal 401a. The ring also has four outputs labeled A, B, C and D, and these outputs go to various gates in said four series of gates and serve to enable them. In general, all of the gates shown in FIG. 4 are "and" gates, meaning that all of the inputs of a gate must be energized before it has any output.

OPERATION

The various major units of the system have now been generally described, and the following description will set forth the circuitry in greater detail and in terms of their operation.

After each complete cycle of the system, the subtotal register is left in reset condition with no entries in the registers. This reset is accomplished by the same signal as dispenses the change in position 7 of the totalizing programmer 315, which is delivered to the reset wire 250 through the wire 350, to reset the four counters of the subtotal register 210 to zero. Moreover, the item price register 201 is also reset to zero since a pulse is delivered to all of the reset terminals of this register through the wire 151 and the wire 251 each time one of the keys of the item keyboard 101–104 is depressed. It will be noted that the wire 151 connects to the leftmost row of terminals on each of the switches 101b through 104b of the keys 101–104. Thus, each time one of these keys is depressed a pulse is sent to clear the item price register. At the beginning of a completely new entry and calculation cycle of the system, at which time all of the subtotal register counters are set to the zero position, a pulse is delivered to the wire 151 by the closing, for instance, of switch 104b when the key 104 is depressed, this pulse coming from the B+ terminal at the top of FIG. 1. The pulse travels downwardly into the wire 251 and resets the item price register, and also part of the energy of this travels through the diode 128 and the capacitor 129 into the gate 130. This gate is different from the other gates in the system and permits a pulse arriving on wire 131 to pass through provided there is no input on the wire 132. There will, in fact, be no input on the wire 132 except during a subsequent tax computation which will be described hereinafter. At any rate, whenever any one of the keys 101–104 is depressed, a pulse from B+ is applied through the diode 128 and the capacitor 129 to the gate 130 and into the stepping terminal 120b of the count cycle program ring 120. Assuming that this program ring was initially in reset condition, the ring is advanced by the pulse to the cents position, thereby energizing the wire 121 which does three things. First, the wire 121 delivers an output through the diode 121a and wire 119a to turn on the flipflop 119 and energize the pulse generator 125, which generator then begins delivering pulses at its own rate until the flipflop 119 is turned off by a later pulse arriving on wire 134. Secondly, the energizing of the cents output 121 delivers an output signal to the gate 115 in the cents column and renders this gate conductive to pass pulses arriving through the wire c. Third, the energizing of the cents position of the count cycle program ring 120 sends a signal through the wire 221 to enable the gate 202 and thereby open the gate 202 so that the pulses arriving from the pulse generator 125 through the wire 225 can begin stepping both the item price cents register 201a and the subtotal cents register 210a. Returning to the pulse generator 125 which has just been enabled, pulses begin passing outwardly through the wire 125a into the stepping terminal 114b of the count cycle decade ring 114. The ring is initially resting in the zero position, and assuming that the key 104 was depressed, there will be no output along the wire c from the zero position of the ring 114 since the item pricing switch 113 is in the No. 8 position. Not that the pressing of the key 104 selected the top row of item pricing switches 111, 112 and 113 and that the enabling of the gate 115 by the cents output on wire 121 of the count cycle program ring 120 selected only the outputs along the wire c going to the gate 115, since the other three gates 116–117 and 118 are all blocked. Thus, the only switch which is actually selected among the item pricing switches is the switch 113.

The first pulse from the generator 125 to the count cycle decade ring 114 stepped it to Position 1. The second pulse steps it to Position 2 and there is still no output. Likewise, there is no output in Positions 2, 3, 4, 5, 6, and 7, but in Position 8 a signal passes upwardly through the wire 198 and into the No. 8 terminal of the item pricing switch 113, through its wiper and then leftwardly through the wire 113a into the switch 104c and down through the wire c and through the gate 115. Since the gate 115 is enabled by a signal on wire 121, the pulse continues through the gate and travels rightwardly along the wire 134 into the reset terminal of the count cycle decading ring 114a and to the "off" terminal of the flipflop 119. Thus, the count cycle decade ring 114 is reset to ztro and the pulse generator 125 is turned off when coincidence is found in the No. 8 position of the switch 113. Eight pulses have passed from the pulse generator into the stepping terminal 114b. Likewise, eight pulses have passed downwardy through the wire 125a and the wire 225, through gate 202 and into the wire 213. From the wire 213, the pulses entered the stepping terminal of both cents registers 201a and 210a so that each of these registers now reads 8. Moreover, some of the output from the gate 115 passes downwardly through the diode 115a and rightwardly along the wire 131, through the normally conductive gate 130 and into the stepping terminal 120b of the count cycle program ring 120, thereby stepping the ring to the dimes position to provide an output along wire 122. Again, the output along wire 122 does three things. It enables the gate 203 so that pulses coming from the pulse generator and the wire 225 will step the dimes registers 210b and 201b. The output along wire 122 also travels rightwardly through diode 121b to turn the flipflop 119 back on so that the pulse generator is once again restored to action and begins putting out a new train of pulses. And third, the output from the dimes position of the count cycle program 120 travels up through the wire 122 and enables the gate 116 in the dimes column. Since the key 104 is still depressed, the pulses pass one by one into the stepping terminal 114b to start advancing the count cycle decade ring 114. This time, item pricing switch 112 was selected by the key 104 and the gate 116. The output signal from the decade ring 114 finds no coincidence with the zero position of the switch 112. A pulse on wire 125a steps the count cycle decade ring to the Position No. 1 and this pulse passes upwardly on wire 191 and also finds switch 112 open in Position 1. The next pulse leaves the count cycle decade ring on wire 192 and travels upwardly to the No. 2 terminal of the switch 112. Since the wiper of the switch 112 is in the No. 2 position, the pulse passes through the switch and travels to switch 104d, and since this switch is closed because the key 104 is depressed, the pulse travels downwardly through the wire d through the enabled gate 116 and down through the diode 116a, and rightwardly through the wire 134 into the reset terminal 114a of the count cycle decade ring 114, thereupon resetting it to zero. The wire 134 is also connected to the "off" terminal of the flipflop 119 which is then turned off to disable the pulse generator. It required two pulses to count the count cycle decade ring to Position 2 and therefore only two pulses were delivered by the pulse generator 125 before it was turned off. These two pulses also traveled downwardly through the wire 225, through the gate 203, and into the wire 214 to step the dimes register 201b and the dimes register 210b both to Position No. 2. Both the dimes registers, therefore, read 2. Part of the output from the gate 116 also travels leftwardly on wire 134 through diode 115a, wire 131, and gate 130 into the step terminal 120b of the program ring 120, thereby advancing it to the dollars position, in which it enables three things. The output from the terminal 123 enables gate 204 through wire 223, turns on the flipflop 119 through diode 121c, and enables the gate 117 through the wire 123. The pulse generator 125 begins counting, and counts from Position 0 in which there is no coincidence with item pricing switch 111 into Position No. 1. In this position, the output of the ring 120 passes upwardly through the wire 191, through the terminal No. 1 of the switch 111 and leftwardly through the switch 104c and then downwardly through the wire e and the gate 117, through the diode 117a, and rightwardly through the wire 134 into the reset terminal 114a of count cycle decade ring 114. Thus, the count cycle decade ring 114 is reset to 0 after having passed only one pulse, and also the pulse generator 125 is turned off after having delivered only one pulse downwardly through the wire 225 and through the gate 204 and wire 215 to step the dollars register counter 201c into the one dollar position, and likewise step the subtotal register 210c into the one dollar position. Consequently both registers now read $1.28. At this point, an output is delivered from gate 117 through the gate 127 and the wire 135 to the rest terminal 120a of the count cycle program ring 120, thereby resetting the ring to the "off" position without having enabled the tens position, it being assumed in this example that no item exceeding $9.99 is to be entered in the register. The tens position of the count cycle program ring 120 is necessary only for use in connection with entries in the cash keyboard 230 in the event that a person hands the operator a ten-dollar or a twenty-dollar bill in payment for the items entered in the register system.

As stated above, the count cycle program ring 120 has now been reset to the off position, and in this position the system pauses and waits until another key on the item keyboard including the keys 101 through 104 is pressed. The present system operates so rapidly that all of the functions stated in the foregoing in connection with the price of $1.28 are actually performed before the operator can release the item key which was pressed. Therefore, subsequent items can also be entered as fast as the operator can press the button.

In entering the next item in the system, for instance the item represented by key 102, when this key is depressed by the operator the counter 102a records that another item is being entered and keeps track of the total number of that item which has been entered. In addition, switch 102b is closed which resets the entire item price register 201 to zero through wires 151 and 251, and which also energizes the stepping terminal 120b of count cycle program ring 120 through the diode 128, the capacitor 129 and the gate 130. This steps the count cycle program ring from the off position to the cents position, thereby energizing the wire 121 and enabling the gate 115. In a manner similar to the searching of the item pressing switches 113, 112, and 111, the count cycle decade ring 114 searches the item pricing switches 110, 109 and 108. As the decade ring counts upwardly, it reaches Position No. 2 in which coincidence is found with Position 2 of the switch 110, and the two pulses from the pulse generator 125 which were necessary to count the ring upwardly to find coincidence in Position 2 of switch 110 are also entered in the item pricing register which now reads 2 in the cents digit 201a, and these two pulses are also entered in the cents position of the subtotal register 201a. However, this register was not reset to 0 and still reads 8 from the first item entered. Therefore, it will be counted up until it reaches 0 by adding two more pulses to the count of 8. When it reaches 0, it delivers a carry pulse through the capacitor 210e to the stepping terminal of the dimes register 210b and advances it from the No. 2 position to the No. 3 position. Subsequenty, on the next cycle of the count cycle decade ring 114, coincidence is found with switch 109 in the 0 position. But since this position is already energized in the count cycle decade ring, an output is delivered through the gate 116 to step the count cycle program ring 120 to the dollars position 124 from the dimes position 123, this pulse being delivered through the diode 115a and the wire 131. In this position the count cycle decade ring 114 has to count to the No. 9 position before coincidence is found, and in this position, a pulse is delivered through the gate 117 and through the gate 127 to the reset terminal 120a of the count cycle program ring 120. The ring then resets and at this point the item price register 201 reads $9.02, and the subtotal register 210 reads $10.30, this amount comprising the first entry $1.28 plus the second entry $9.02 and since in the dollars register $1 plus $9 equals $10, a carry pulse was sent through the capacitor 210g from the subtotal register 210c, Position 0, to step the tens register 210d to Position No. 1.

When the next item key, 101 for example, is depressed, the closing of the switch 101b sends a pulse down the wire 151 and 251 to again reset the item price register to 0. Then, in three separate coincidence cycles, the item pricing switches 107, 106 and 105 are respectively scanned by the count cycle decade ring and coincidence is found in Positions 6, 3 and 5 respectively, representing $5.36. Thus, six pulses are added to the subtotal register 210a to bring this reading to 6 without a carry pulse; three pulses are entered in subtotal register 210b to bring this reading to 6 without any carry pulse through the capacitor 210f; and five pulses are entered in the register 210c without any carry pulse, so that at the end of this cycle the subtotal register reads $15.66.

It is now assumed that all of the purchased items have been entered in the system, and at this point the operator presses the "total" key 212 located in the upper righthand corner of FIG. 2, to close the switch 213 and apply a pulse of plus voltage to the item price register reset terminals through the wire 213a to reset the item price register 201 to 0. This same pulse travels to the right from the "total" key switch 213 and through the wire 313 and the capacitor 314 to step the totalizer programmer 315 from the "off" position 315c to the No. 1 position.

Until the moment when the totalizer key 212 is depressed, thereby indicating to the system that all item entries have been completed by the operator, the count cycle program ring 120 has controlled the functions of the machine.

TOTALIZING PROGRAMMER

Now, the subsequent functions of the machine are controlled by the totalizing programmer 315 in cooperation with the count cycle program ring, and this programmer performs seven steps in sequence before resetting to its "off" position.

In Position 1 of the totalizing programmer 315 an output voltage is applied to the wire 309, to the wire 209, and to the operating winding 208 of the register switching relay 206. Until now, the 33 switch circuits within the relay 206 have all been in the "up" position connecting the cables 207 and 307 to the item price register 201 exclusively. This means that the printer 301 has been connected through the wires 302 and through the display relay 303 with the output of the item price register. The printer and display unit 301 has its command input 301a connected by wires 335, 235, and 135 to the outputs of the gates 118, 127 and 136 which issue command signals to reset the count cycle program ring 120 after the digits have been scanned for coincidence, and this same signal is used to actuate the printer and display unit. Therefore, the printer and display unit 301 has been displaying each of the item prices as they are entered by the operator, but has not displayed the contents of the subtotal register which has been adding these prices together as they were entered.

In Position 1 of the totalizing programmer 315, the relay winding 208 is energized, and the 33 switches within the register switching relay 206 are moved to the down position so as to connect the cable 207–307 directly with the outputs of the subtotal register 210. Thus, the printer and display now records and shows the subtotal of the items entered. In addition, in Position 1 of the totalizing programmer an output is delivered through the diode 318 and the wire 319 to the delay unit 317. This delay unit merely introduces a brief pause so as to give the mechanical relays 206 and/or 303 time to operate before the printer and display unit is actuated. At the end of this brief delay introduced by the unit 317, a signal is transmitted through the wire 320 and an isolation diode into the command unit 301a of the printer and display unit so as to cause it to print and display the subtotal from the register 210. In addition, another output is delivered from the delay circuit 317 along the wire 321 through the diode 322 and into the stepping terminal 315b of the totalizing programmer 315, which then steps to Position 2 and releases the register switching relay 206.

In Position 2 of the totalizing programmer 315, an output is delivered through the wire 355 into the wire 255 and downwardly into the wire 455 which delivers a pulse through the diode 456 and turns on the tax program ring 401, placing it in Position A and this same pulse on wire 255 also travels upwardly through diode 256 into wire 131 to step the program ring 120 to the cents position. In this same position of the programmer 315, a pulse is subsequently delivered upwardly along the wire 457, the wire 257, and into the wire 132 in FIG. 1, which wire actuates the normally-conductive gate 130 and causes it to become an open circuit so as to prevent stepping of the program ring 120 out of the cents position. It is to be remembered that the gate 130 was different from the other gates to the extent that it normally provided a path through it from the wire 131 into the stepping terminal 120b in the absence of an output along the wire 132. This output is now furnished so that the gate 130 is blocked, with the result that the output from the totalizing programmer in Position 2 along the wire 355, the wire 255, and upwardly through the diode 256 into the wire 131 cannot cause the count cycle program ring to step because the gate 130 is blocked. As stated above, the tax program ring 401 has now been stepped from "off" position 401a to the A position by a pulse entering at the start terminal 401c. Since the wire 457 is energized in the A position of the program ring 401, certain of the gates shown in FIG. 4 also have one of their input terminals energized through the diode 458. For instance, there are six gates shown in the upper part of FIG. 4 and each of these gates has three input terminals on top of it, and all three of these input terminals must be energized before an output can appear at the bottom of the gate. The rightmost input to each of the gates 402–407 inclusive is each connected with the diode 458 so that all of these gates are partially enabled whenever the A position of the tax program ring 401 is energized. The leftmost terminals and the center input terminals of these gates are then respectively connected to the cents and dimes digits of the subtotal register 210 by way of cables 441, 241 and 442, 242, respectively. By way of the cable 441, all of the ouputs from 0 to 5 of the cents register 210a are connected together by the wire 408 which is coupled through blocking diodes to the center terminals of gates 402, 404 and 406. In a similar manner, the 5, 6, 7, 8 and 9 terminals of the cents register 210a are connected through appropriate blocking diodes with the center terminals of the gates 403, 405 and 407 by way of the wire 409. The outputs of the dimes register 210b are connected through cable 242 and 442 to the leftmost terminals of the gates 402–407 as shown in the drawing, in which the 0 and 1 digits of the register 210b are connected with the gates 402 and 403, the 2 digit of the register 210b is connected with the leftmost terminal of the gate 404, and the 3 digit is connected with the leftmost terminals of the gates 404 and 405. The 4 and 5 digits are connected together and are connected to the gate 406; and the 7, 8, and 9 digits of the dimes register 210b are connected with the gate 407. There are other connections which will be more fully explained hereinafter.

The present tax computer is set up to operate with a table of taxes as follows:

*Tax chart*

| Total purchases | Tax |
|---|---|
| .00–.15 | 0 |
| .16–.35 | 1 |
| .36–.65 | 2 |
| .66–1.15 | 3 |
| 1.16–1.35 | 4 |
| 1.36–1.65 | 5 |
| 1.66–2.15 | 6 |
| 2.16–2.35 | 7 |
| 2.36–2.65 | 8 |
| 2.66–3.15 | 9 |
| 3.16–3.35 | 10 |
| 3.36–3.65 | 11 |
| 3.66–4.15 | 12 |
| 4.16–4.35 | 13 |
| 4.36–4.65 | 14 |
| 4.66–5.15 | 15 |
| 5.16–5.35 | 16 |
| 5.36–5.65 | 17 |
| 5.66–6.15 | 18 |
| 6.16–6.35 | 19 |
| 6.36–6.65 | 20 |
| 6.66–7.15 | 21 |
| 7.16–7.35 | 22 |
| 7.36–7.65 | 23 |
| 7.66–8.15 | 24 |
| 8.16–8.35 | 25 |
| 8.36–8.65 | 26 |
| 8.66–9.15 | 27 |
| 9.16–9.35 | 28 |
| 9.36–9.65 | 29 |
| 9.66–10.15 | 30 |
| 10.16–10.35 | 31 |
| 10.36–10.65 | 32 |
| 10.66–11.15 | 33 |
| 11.16–11.35 | 34 |
| 11.36–11.65 | 35 |
| 11.66–12.15 | 36 |

*Tax chart*—Continued

| Total purchases | Tax |
|---|---|
| 12.16–12.35 | 37 |
| 12.36–12.65 | 38 |
| 12.66–13.15 | 39 |
| 13.16–13.35 | 40 |
| 13.36–13.65 | 41 |
| 13.66–14.15 | 42 |
| 14.16–14.35 | 43 |
| 14.36–14.65 | 44 |
| 14.66–15.15 | 45 |
| 15.16–15.35 | 46 |
| 15.36–15.65 | 47 |
| 15.66–16.15 | 48 |
| 16.16–16.35 | 49 |
| 16.36–16.65 | 50 |
| 16.66–17.15 | 51 |
| 17.16–17.35 | 52 |
| 17.36–17.65 | 53 |
| 17.66–18.15 | 54 |
| 18.16–18.35 | 55 |
| 18.36–18.65 | 56 |
| 18.66–19.15 | 57 |
| 19.16–19.35 | 58 |
| 19.36–19.65 | 59 |
| 19.66–20.15 | 60 |
| 20.16–20.35 | 61 |
| 20.36–20.65 | 62 |
| 20.66–21.15 | 63 |
| 21.16–21.35 | 64 |
| 21.36–21.65 | 65 |
| 21.66–22.15 | 66 |
| 22.16–22.35 | 67 |
| 22.36–22.65 | 68 |
| 22.66–23.15 | 69 |
| 23.16–23.35 | 70 |
| 23.36–23.65 | 71 |
| 23.66–24.15 | 72 |
| 24.16–24.35 | 73 |
| 24.36–24.65 | 74 |
| 24.66–25.15 | 75 |
| 25.16–25.35 | 76 |
| 25.36–25.65 | 77 |
| 25.66–26.15 | 78 |
| 26.16–26.35 | 79 |
| 26.36–26.65 | 80 |
| 26.66–27.15 | 81 |
| 27.16–27.35 | 82 |
| 27.36–27.65 | 83 |
| 27.66–28.15 | 84 |
| 28.16–28.35 | 85 |
| 28.36–28.65 | 86 |
| 28.66–29.15 | 87 |
| 29.16–29.35 | 88 |
| 29.36–29.65 | 89 |
| 29.66–29.99 | 90 |

This table is believed to be characteristic of the tax low in many states, and it will be noted from 0 to 15¢ there is no tax and this condition is signaled by the operation of the gate 402 the output of which operates the zero wire in the bundle 446 of ten wires. From 16¢ to 19¢ there is the tax of one penny, and this is also the case for taxes on sums between 20¢ and 35¢. The tax in the 16¢ to 35¢ range is controlled by the gates 403—404, which however are operative under different conditions so as to account for other tax breaks, for instance between $1.66 and $2.15 or the tax break between $2.66 and $3.16. In other words, tax breaks are repeated subsequently at higher dollar values and for this purpose the various gates shown in the upper portion of FIG. 4 are required. There is another tax between 36¢ and 39¢ which also breaks at 40¢ and extends from 40¢ to 65¢, and these two tax levels are taken care of by the gates 405 and 406, the outputs of which are connected to the number 2 wire of the bundle 446. Finally, there is a tax level between 66¢ and 99¢, and this level is taken care of by the gate 407 having its output connected to the number 3 wire of the bundle 446. These gates not only operate on sums below $1, but they also operate to contribute to the tax on sums higher than $1. In the former case, the rightmost input to each of the gates 402 to 407 is enabled by an output pulse from Position A of the tax program ring 401 through the diode 458. However, after the sum of $1 is exceeded, these same gates come into play again, for instance in Position C of the tax program ring 401 through a diode 410, as will be hereinafter discussed.

The dollars gates are shown below the cents gates and are fed by the cable of wires 243 and 443 which come from the dollars digit of the subtotal register 210c. These wires coming from the dollars register 210c are labeled 0 through 9, inclusive, and only one of these is energized at a time. The gates in this series are labeled 411, 412, 414, 415, 416, 417, 418, 419 and 420, and in addition there are three other gates labeled 21, 22 and 23 which are operated in conjunction with the C position of the tax program ring 401. The dollar gates 411–420, inclusive, are never enabled unless the tax program ring 401 is in the B position so as to enable the rightmost input to each of these gates. The leftmost input is then enabled by whichever one of the dollars outputs from the subtotal register 410c is currently active.

Below each of the gates 411–420 is a single number which indicates the number of cents output from the gate in the event the gate is actuated, and the manner of arriving at these values will be presently discussed. In Position C of the program ring 401 the gates 402 through 407, and the gates 421 through 423 are enabled.

Finally, there is the tens digit which is enabled in Position D of the tax program ring 401, and the tens gates comprise three gates 424, 425 and 426 each of which is enabled by one of the outputs of the tens subtotal register 210d via cable 244 and 444. Each one of the outputs 0, 1, and 2 from the tens register 210d is applied to one of these gates and an output from a gate occurs when both inputs are enabled in the D position of the tax program ring 401. The outputs from these gates are connected with the 0, 3 and 6 wires of the bundle 446. As is the case with all of the other gates in FIG. 4, the gate has no output unless all of its inputs are enabled.

There is a bottom row of ten gates labeled 427, 428, 429, 430, 431, 432, 433, 434, 435 and 436 connected with the number 0 through 9 wires of the bundle 446 and having a second set of inputs connected respectively with the ten wires coming out of the ten positions of the count cycle decade ring 114 via the cable 245 and 445 which connects with the cable of wires 145 in FIG. 1. Since the gates 427–436 are connected with the outputs of the gates 402 through 407 and with the outputs of the gates 411 through 426, when the outputs of some of these tax computer gates energize corresponding ones of the inputs to gates 427–436, an output appears at the bottoms of the energized gates as shown by the numeral located within the gate.

At different times the outputs from the row of gates across the bottom of FIG. 4 will be either in cents or dimes, and it is the function of the gates 437 and 438 to determine whether the output is recorded in the dimes register 201b or the cents register 201a. The gate 437 is enabled through the diodes 437a and 437b whenever the tax program ring 401 has an output either at Position A or at Position B. Likewise, the gate 438 is enabled through the diodes 438a and 438b whenever there is an output through the C or the D position of the tax program ring 401. If the A or B output enables the gate 437, the output of the row of gates across the bottom of FIG. 4 is in pennies and is routed to the cents register 201a by the gate 437, whereas if the C or D output of the tax program ring 401 enables the gate 438, the output from the row of gates across the bottom of FIG. 4 is in dimes and is routed to the dimes register 210b by the gate 438. The manner of operation of these circuits will now be described in connection with the present numerical example of the system as related above in which the total amount of purchases entered into the system is $15.66, and is contained in the subtotal register 210.

Remembering that the totalizing programmer 315 has just entered Position 2 and that an output along wire 355–255 and 455 has just stepped the tax program ring 401 from "off" position 401a to the A position, it appears that the rightmost inputs to gates 402–407, inclusive, have all been enabled. Since at this time the subtotal register 410 contains $15.66, the number 6 wire of the cents register 210a is energized, and therefore the wire 409 is energized so as to energize the center inputs of gates 403, 405 and 407. Therefore, the gates 402, 404 and 406 cannot deliver an output in this position. Moreover, the dimes register 210b is also energized in the No. 6 position and through cable 242 energizes the No. 6 wire in cable 442 thereby energizing the leftmost terminal in gate 407 and the leftmost terminal in gate 406. 406 cannot deliver an output because its center terminal is not energized, but gate 407 has all of its inputs energized.

Since the count cycle program ring 120 was turned on when the programmer 315 stepped to position 2, the flip-flop 119 is turned on by a signal through the diode 121a and the pulse generator 125 begins actuating the decade ring 114. It sequentially delivers outputs along the cable 145, 245, 445. Since the gate 407 is energized, it energizes the number 3 wire in the bundle 446 and enables one input to the gate 430. When the count ring 114 counts to 0, 1 and 2 it enables one input of gates 427, 428 and 429, but these gates have no output because their other inputs are dormant. When ring 114 counts to 3, it energizes the other input to gate 430 and this gate delivers an output representing 3¢ to gate 437 which is energized in position A of the tax program ring 401, gate 438 through the gate 437, and through two output diodes 437c and 437d. The output from the diode 437d travels upwardly along wire 437e into FIG. 2 through wire 237e and into wire 137e which is connected to an input of the gate 115. Meanwhile, the count cycle program ring 120 has been providing an output in the cents position along wire 121 which enables the gate 115 which delivers an output on wire 134 to reset the decade ring 114 and turn off the flipflop 119. The pulse also travels through the diode 115a, but cannot reach the stepping terminal 120b of the count cycle program ring 120 because the gate 130 is presently blocked by the signal on the wire 132 from tax ring position A. The ring 120 therefore remains in the cents position. The three pulses from the generator 125 while it was counting travel downwardly into the enabled gate 202 and wire 213 and step the cents register 201a to read 3 and the subtotal register 210a to read 9 instead of 6. The other output from the gate 437 passes through the diode 437c and steps the tax ring 401 to the B position, and thereby disables the A position.

The B output of the tax program ring 401 energizes the dollar gates 411–420. These gates each have one of their inputs connected with the cable 243 and 443 and the register 210c which contains the numeral 5 in the dollars digit so as to enable the No. 5 gate 416. The output of the gate 416 is connected to the No. 5 wire in the cable 446 which in turn enables the No. 5 gate 432 at the bottom of the page. The output of this gate is connected through the gate 437 because the tax program ring is in Position B. So far only 3¢ has been calculated, entered in the registers, although the total tax on $15.66 is 48¢. With the rightmost terminal of the gate 432 energized by the gate 416, the gate 432 is now enabled on one side. Moreover, when the tax computer ring 401 stepped to position B it delivered a pulse to turn on flip-flop 119 through wires 499, 299 and 199. The gate 115 is still energized because the count cycle program ring 120 was not stepped to the dimes position when the flip-flop 119 was turned back on to begin the pulse generator 125 counting again. This time the decade counter ring 114 counts through 0, 1, 2, 3, and 4, and in Position 5 coincidence is had through the No. 5 wire of the cables 145, 245 and 445 which enables the other side of the gate 432. Since the Position B of tax program ring 401 is still energized, the output from gate 432 passes through gate 115 and wire 134 to reset the ring 114, shut off flip-flop 119 and through gate 130, now unblocked, to advance the count cycle program ring 120 to the dimes position. The output of the gate 432 also steps the tax ring 401 through the diode 437c to its position C.

Before the count cycle program ring 120 was stepped into the dimes position, the 5¢ entry from the gate 432 was also entered by delivering the five pulses from the pulse generator 125 through the gate 202 into the register 201a, which register previously contained the 3¢ from the gate 430. Now the 5¢ from the gate 432 is added to it so that it reads a total of 8¢. These pulses also enter the subtotal register 210a and advance it to read 4 while carrying one pulse to the register 210b to make it read $15.74.

In Position C, the gates 421, 422 and 423 are enabled, and since the No. 5 wire of the dollars cable 443 is still energized, an output is delivered from the No. 5 wire downwardly through the diode 416a to enable the left input of the gate 422, the rightmost input being enabled by position C of the tax program ring 401. The output from this gate enables wire No. 1 of the cable 446 which then enables the right input to gate 428. The count cycle decade ring 114 then begins counting since the flop flop 119 was turned on when the program ring 120 was advanced, and ring 114 moves from the position 0 to Position 1 and in this position finds coincidence through the No. 1 wire of the cable 145, 245, 445 to enable the gate 428. However, this gate does not deliver an output through the gate 437 but through the gate 438 because in the C position of the tax program ring 401 gate 438 is energized. Thus, gate 438 delivers an output through the diode 438d upwardly through wire 438e, 238e, and 138e, and this wire is connected to an input of the gate 116 so that the pulse is then delivered downwardly through the diode 116a and the wire 134 to reset the count cycle decade ring 114 and to turn off the flip flop 119, thus stopping the flow of pulses from the generator 125. The output of the diode 116a is also connected with gate 130 through diode 115a, but in position C of the tax program ring 401, gate 130 is blocked by sending an output to it through diode 410, and wires 457, 257 and 132. For this reason the count cycle program ring 120 is not stepped, but remains in the dimes position.

However, before being returned to the rest position the pulse generator 125 delivered one pulse to the cable 145 and found coincidence in Position 1 of gate 428. The output from gate 428 passed through the gate 438 and through the diode 438d and the wires 438e, 238e and 138e and to gate 116 to shut off the flip flop 119 and stop the pulses. It took only one pulse to reach coincidence. This pulse was delivered through the gate 203 to the dimes register 201b so that 10¢ has now been entered into that register thereby bringing the total of the tax calculated and entered so far to 18¢. This 10¢ entry was likewise entered in register 201b thereby bringing its reading up to $15.84.

The other output from the gate 116 travels down to the gate 136, but this gate is blocked except in position D of the tax computer ring 401, the lower input of the gate 136 being connected with the output D of the tax program ring 401 through the diode 447 and the wires 448, 248 and 148.

In the D position of the tax program ring 401 the gates 424, 425 and 426 are enabled at their righthand inputs and since the No. 1 position of the tens register 210d is activated, the gate 425 is activated and delivers an output to the No. 3 wire of the cable 446 which in turn enables the No. 3 gate 430. The output from the D position of the tax program ring passes through diode 447 and up through wire 448, 248 and 148 to enable the gate 136. The pulse generator 125 is again turned on by enabling the flip-flop 119 by a pulse sent from position D through the wires 499, 299 and 199, and the count cycle decade ring 114 is again counted upwardly in an effort to find coincidence. Three pulses are necessary to provide an output which travels along cable 145, 245, and 445 to find coincidence again at gate 430. The output from this gate, representing the numeral 3, passes through the C and D gate 438 to the diode 438c which then steps the tax program ring to its final or "off" position. Also, there is an output from the gate 438 which passes upwardly through the diode 438d and the wire 438e, 238e and 138e to reset the count cycle program ring 120 to 0 position through the gate 116 and the gate 136, enabled in position D. While the pulse generator 125 was counting to locate coincidence with the gate 425, its three pulses were being delivered via the gate 203 to the dimes registers 201b which already contains one tax pulse and therefore now reads 4. Therefore, in the item price register the total tax is accumulated and reads 48¢ in the dimes and cents registers, and the subtotal register now reads $15.66 plus 48¢ tax, or $16.14.

The output of gate 136 also delivers a pulse to step the totalizing programmer 315 to Position 3 through the wires 138, 238 and 338 connected to the stepping terminal 315b. In position 3 of the totalizing programmer 315 an output is delivered through a diode 324 and this output travels along the wire 319 to the delay 317 which, after a brief delay, energizes the print and display unit 301 through the wire 320. At this point winding 208 of the register switching relay 206 is not energized and therefore the switches are all in the "up" position, meaning that the item price register is connected with the cable 207, 307 and through the relay 303 into the print and display unit 301. Therefore, the tax amount of 48¢ which is contained in the item price register 201 is displayed and printed. Finally, the output from the delay circuit 317 passes through the wire 321 and the diode 322 and steps the totalizing programmer into position 4. Prior to the commencing of the tax computing step the item price register had been reset to 0 by a pulse from the wire 321, diode 322 and wires 313 and 213a, the same pulse which advanced the programmer 315 to position number 2. At this time, the subtotal register 210 contained $15.66. During computation of the tax, a total tax of 48¢ was added to both registers 201 and 210 as just related in detail.

In position 4 the output of the totalizing programmer 315 is delivered through the diode 360 into the wire 309 and into the relay winding 208 so as to deflect the relay switching arm downwardly to connect the cable 207, 307 with the subtotal register 210 output. This output is then delivered to the printer and display means 301 by way of the cable 302. Also in position 4 of the totalizing programmer 315 an output is delivered by way of diode 361 to the delay circuit 317 through the wire 319, and after a brief delay designed to give the relay 206 time to operate, the printer and display means receives a command by way of wire 320 and prints and displays the subtotal contained in the register 210, this subtotal comprising the purchased items plus tax. A signal is also delivered from the delay circuit 317 by way of the wire 321 and the diode 322 and this signal steps the totalizing program to position 5. In position 5, the change key is enabled, but the system remains dormant in this position pending initiation of the next series of events when the operator presses the "change" key 362. The stepping signal which arrives at the totalizing programmer 315 by way of the diode 322 also passes through the capacitor 314 and the wire 313 to the wire 213a and this signal resets the item price register 201 to read zero in all digits. A signal from wire 209 through diode 218, wire 257 and wire 132 blocks the gate 130 and prevents the signal on wire 213a from passing upwardly through the wire 151 and causing the count cycle program ring to step.

As stated above, in position 5 of the totalizing programmer 315 the system pauses and does not progress any further until the operator enters on the cash keyboard 230 the amount tendered by the customer in payment of the total bill of the $16.14. Assume, for the sake of discussion, that the customer tenders a twenty-dollar bill. The operator presses the $20 key which is labeled 230a and thereby closes the switches 230b and 230c. Since the customer tendered only the $20, none of the other keys on the cash keyboard need to be operated which means that the zero positions in the other three digits remained closed. Since the operator has now entered all of the cash tendered, she presses the change key 362 to signify this fact, thereby closing the switch 363 and applying a signal from the totalizing programmer, position 5, to the wire 358. This signal from the wire 358 accomplishes two purposes. In the first place, it passes through the diode 359 and into the stepping terminal 315b of the totalizing programmer 315 and actuates this programmer to step it to position No. 6. Simultaneously the signal from the wire 358 passes leftwardly to the wire 258 and the diode 259 and through the wire 131 to step the count cycle program ring from the "off" position to the cents position, thereby providing an output on the wire 121. At this moment, the item price register 201 is reset to zero and contains nothing. The subtotal register 210 contains the total of the items plus tax, namely $16.14. Also, the cash keyboard 230 contains an entry of $20.

The change due the customer is calculated by determining the number of pulses in each digit which must be added to the subtotal register 210 in order to count it up to the amount entered in the cash keyboard 230. Since the subtotal register contains $16.14 and the cash keyboard contains $20.00, it will require $3.86 in order to count the subtotal register 210 up to coincidence with the amount entered in the cash keyboard 230. It is for this purpose that the count cycle program ring has been enabled and advanced to the cents position. In the cents position of the program ring 120 the gate 202 is enabled so that pulses from the pulse generator will pass through that gate and advance both the item price register cents digit 201a and also the subtotal register cents digit 210a. Also, the flipflop 119 is moved to the "on" position by a pulse from the wire 121 through the wire 119a so that the pulse generator 125 begins counting. Furthermore, the gate 115 in the cents digit has also been enabled by the signal on the wire 121. The pulse generator 125 begins counting out pulses, which pulses pass downwardly through the wire 125a and into the gate 202 by way of the wire 225. Since the gate 202 is enabled, these pulses also pass to the wire 213 and begin stepping the register 201a and the register 210a in the forward direction. At this point, since $20 is entered in the cash keyboard 230, the following switches are closed: in the tens digit the switches 230b and 230c are closed because the key 230a was depressed. Likewise, since 0 appears in the dollars digit of the keyboard 230 the keys 230d and 230e are closed. Since 0 appears in the dimes digit, the switches 230f and 230g are closed; and since 0 appears in the cents digit the switches 230h and 230k are closed.

As stated above the pulse generator 125 is emitting pulses down through the wire 225, the gate 202 and the wire 213, and the registers 201a and 210a are being counted upwardly. The register 210a was left in position No. 4 since it contained the amount $16.14, and therefore it takes six pulses to count it up to read 0, and when it does reach 0, coincidence is established through the switch 230k and a coupling diode, and through the wire 237e and the wire 137e and into the cents gate 115 which is now enabled. The output of the cents gate travels downwardly through the diode 115a and through the wire 131 and the normally conductive gate 130 into the stepping terminal of the count cycle program ring 120, and thereby advances the ring from the cents position to the dimes position. The output from the gate 115 also resets the decade ring 114 and turns "off" the flipflop through the wire 134.

In the dimes position of the count cycle program ring 120 the wire 122 is energized thereby enabling the gate 203 and the gate 116 and starting the pulse generator 125 going again. With the flip-flop 119 turned on again, the pulses from the pulse generator pass downwardly through the wire 225 and through the gate 203 into the wire 214. These pulses advance the dimes register 201b from its 0 position and also advance the dimes register 210b which, although it was initially in the No. 1 position, is now in the No. 2 position since, when the cents register 210a was counted up to 0, a carry pulse was transmitted through the capacitor 210e to step the dimes register 210b to the No. 2 position. Thus, starting in the No. 2 position it takes eight pulses to advance the dimes register 210b to the 0 position and in that position establish coincidence through the switch 230g and a coupling diode and through the wire 238e and the wire 138e and the gate 116. An output signal is delivered from the gate 116 through the diode 116a and the wire 134 to shut off the flipflop 119 and the pulse generator 125, and to advance the count cycle program ring to the dollars position by a pulse arriving through the wire 131. Since eight pulses were required to advance the dimes digit to coincidence with the 0 position of the cash keyboard, eight pulses were then entered in the dimes register 210b so that it now reads 8 in that digit and 6 in the cents digit.

Having now advanced the ring 120 to the dollars position of the count cycle program ring 120 an output appears on the wire 123 which starts the pulse generator 125 counting again by returning the flipflop 119 to its "on" condition, and the output on the wire 123 also enables the gates 117 and 204. The subtotal register 210 in the dollars digit read 6 initially due to the amount entered therein of $16.14, but when the dimes register was counted to 0 a carry pulse was thereby delivered to the dollars digit 210c by way of the carry capacitor 210f so that the dollars digit now reads 7. The pulse generator delivers three pulses through the gate 204 and thereby counts the subtotal register 210c to 0 from the reading of 7, and in so doing enters 3 in the dollars digit 201c of the item price register which now reads $3.86. Since coincidence is found in the 0 position, an output passes through switch 230e and upwardly through the wire 275 and the wire 175 and a coupling diode into the gate 117. The output from the gate 117 passes downwardly through the diode 117a, the wire 131 and the gate 130 and steps the count cycle program ring into the tens position. An output is delivered through the wire 134 to shut off the flipflop 119 and stop the pulse generator and reset the decade ring 114. At the same time, the output from the subtotal register dollars digit 210c at the 0 position passes through the carry capacitor 210g and steps the tens register 210d from Position 1 which it had occupied previously to Position 2. However, in Position 2 coincidence is established already without requiring any pulse from the pulse generator 125, and therefore the output is delivered immediately through the switch 230c and through the wires 276 and 176 to the gate 118. This gate delivers an output pulse through the wire 135 which resets the count cycle program ring to the "off" position and also delivers a pulse through the diode 118a to the wire 134 which immediately returns the flipflop 119 to its "off" condition before a pulse can be issued from the pulse generator 125. Thus, there is no output through gate 205 and the tens register 210d continues to read 0. At this point, the subtotal register 210 has been counted up to read $20 and the cash keyboard 230 also reads $20, but the item price register 201 reads $3.86 which is the amount of change due the customer and represents the difference between $16.14 contained in the subtotal register and $20 tendered by the customer.

Returning to the totalizing programmer 315, this programmer is still in Position 6 to which it was advanced, and in this position it energizes the winding 305 of the display relay 303 thereby moving the 33 switches therein to the "down" position and connecting the wires in the cable 302 with the 33 wires in the cable 378 which connect with the wires in the cable 278 which connect with the lower row of switches on the cash keyboard. In this way, an output is received in the tens digit from switch 230b in the 2 position, and from switches 230d, 230f and 230h in the 0 positions so that signals representing $20.00 are entered through the cable 302 into the printer and display means 301. Also in Position 6 of the totalizing programmer 315 an output is delivered through the diode 379 to the wire 319 and through the delay circuit 317 to set the printer and display mechanism in motion to display and print the cash entered on the cash keyboard. The output of the delay circuit also passes through line 321 to advance the totalizing programmer to Step No. 7.

In position 7 of the totalizing programmer neither one of the relay windings 208 or 305 is energized and therefore both relays are in the "up" position so that the output of the item price register is connected through the cable 207–307 and the cable 302 in the printer and display means 301. Also, it will be noted that the cents and dimes digits of the item price register 201 are both connected by way of cables 280 and 281 and the cables 380 and 381 to the change dispenser 316. The output from totalizing programmer 315 along wire 382, 350 and 250 resets the subtotal register 210 to read 0 in every digit. Also, the output through the wire 382 from Position No. 7 travels leftwardly along the wire 350 into the command input 316a of the change dispenser 316 thereby causing it to dispense the amount of change found in the dimes and cents register of the item price register 201, namely 86¢. Position No. 7 of the totalizing programmer 315 also has an output through diode 383 to the wire 319, which output passes through delay 317 and actuates the printer and display means 301 to print and display the change due the customer, namely $3.86. Moreover, the output of the delay 317 passes through wire 321 into the stepping terminal 315b of the totalizing programmer 315 and steps the totalizing programmer 315 to its reset position 315a to cause the totalizing programmer 315 to move to its "off" condition at 315c. The output from wire 321 to the stepping terminal 315b also passes through the capacitor 314 and the wire 313 into the reset wire 213a and resets the item price register to 0. Thus, both registers are reset to 0 and the change due has been printed and displayed and the system remains in this condition which comprises the end of its operational cycle.

The present invention has now been fully described in terms of a practical embodiment thereof. However, the scope of the invention is not to be limited by the illustrated embodiment, but only by the scope of the following claims.

I claim:
1. A multiple-item price register system comprising
a cyclic counter having a decade of outputs sequentially energized;
groups of item pricing switches selectable by separate item keys, each group including in each digit a switch including a decade of positions, and all positions of all of the item pricing switches being connected respectively with said decade outputs and in parallel with each other, and the switches being adjustable to represent the price of an item;
first and second multiple-digit register means respectively registering item prices entered and the total thereof, and having in each digit a decade of positions advanced in step with said sequential energizing of said counter outputs when that digit is enabled;
gate means for sequentially connecting said decade outputs to each digit of the register means and simultaneously energizing a corresponding digit of the switches;
circuit means connected through the selected item key to decade positions of the corresponding switches, and responsive to the energizing of a decade position to control the gate means by advancing it to the next digit and to control the cyclic counter to commence a new counting cycle;
and tax computer means including tax gates connected with the register means and selectively enabled thereby as the latter are energized, and connected with the decade outputs of the counter and sequentially enabled thereby, and said gates having means to actuate them when all items have been entered into the system to deliver outputs representing tax amounts connected to be entered into said second register means.

2. A multiple-item price register system comprising
a cyclic counter having a decade of outputs sequentially energized;
groups of item pricing switches selectable by separate item keys, each group including in each digit a switch including a decade of positions, and all positions of all of the item pricing switches being connected respectively with said decade outputs and in parallel with each other, and the switches being adjustable to represent the price of an item;
first and second multiple-digit register means having in each digit a decade of positions advanced in step with said sequential energizing of said counter outputs when that digit is enabled;
gate means operating according to a sequential cycle and connecting said decade outputs to each digit of the register means and simultaneously energizing a corresponding digit of the switches;
circuit means connected through the selected item key to decade positions of the corresponding switches, and responsive to the energizing of a decade position to control the gate means by advancing it to the next digit and to control the cyclic counter to commence a new counting cycle;
means for resetting the first register means to zero each time said cycle of the gate means is completed;
display means;
tax computer means including tax gates connected with the second register means and selectively enabled thereby as the latter are energized and connected with the decade outputs of the counter and sequentially enabled thereby, and said gates having means to actuate them when all items have been entered into the system to deliver outputs representing tax amounts connected to be entered into said register means;
and display switching means for selectively connecting the display means to the first register means to display individual item prices and the tax when computed, and to the second register means to display the subtotal of the items and this subtotal plus tax when computed.

3. A multiple-item price and cash register system comprising
a cyclic counter having a decade of outputs sequentially energized;
groups of item pricing switches selectable by separate item keys, each group including in each digit a switch including a decade of positions, and all positions of all of the item pricing switches being connected respectively with said decade outputs and in parallel with each other, and the switches being adjustable to represent the price of an item;

first and second multiple-digit register means having in each digit a decade of positions advanced in step with said sequential energizing of said counter outputs when that digit is enabled;

gate means operating according to a sequential cycle and connecting said decade outputs to each digit of the register means and simultaneously energizing a corresponding digit of the switches;

circuit means connected through the selected item key to decade positions of the corresponding switches, and responsive to the energizing of a decade position to control the gate means by advancing it to the next digit and to control the cyclic counter to commence a new counting cycle;

means for resetting the first register means to zero each time said cycle of the gate means is completed, the second register means accumulating the subtotal of the items entered;

and cash keyboard means for entering into a group of decade key switches the amount of cash tendered in payment of said subtotal and including means for initiating the cycle of said counter, said key switches being connected respectively with each of the decade positions of the second register means and with said circuit means to actuate the latter to reset the counter when it has counted up the second register means to the amount entered in the actuated key switches, the first register means then reading the difference between the cash tendered and said subtotal.

4. A multiple-item price and cash register system comprising a cyclic counter having a decade of outputs sequentially energized;

groups of item pricing switches selectable by separate keys, each group including in each digit a switch including a decade of positions, and all positions of all of the item pricing switches being connected respectively with said decade outputs and in parallel with each other, and the switches being adjustable to represent the price of an item;

first and second multiple-digit register means having in each digit a decade of positions advanced in step with said sequential energizing of said counter outputs when that digit is enabled;

circuit means cyclically connected through the selected item key to decade positions of the corresponding switches, and responsive to the energizing of a decade position to advance the energization to the next digit and to control the counter to commence a new cycle;

means for resetting the first register means to zero each time said cycle of the circuit means is completed;

tax computer means including means for actuating said counter, and tax gates connected with the second register means and selectively enabled thereby as the latter are energized and connected with the decade outputs of the counter and sequentially enabled thereby, and said gates having means to actuate them when all items have been entered into the system to deliver outputs representing tax amounts connected to be entered into said register means, the first register means then reading the tax amount and the second register means reading the total of the item prices plus the tax;

and cash keyboard means for entering into a group of decade key switches the amount of cash tendered in payment of said total and including means for initiating the cycle of said counter, said key switches being connected respectively with each of the decade positions of the second register means and with said circuit means to actuate the latter to reset the counter when it has counted up the second register means to the amount entered in the actuated key switches, the first register means then reading the difference between the cash tendered and said total.

5. In a system as set forth in claim 4, display means for displaying the entries in the register means;

and in the cash keyboard means;

display switching means for selectively connecting the display means;

and system sequence programming means comprising a step-by-step ring counter having an output voltage corresponding with each step, the output voltages being connected in sequence to actuate the tax computer means after all item prices have been entered and to actuate the cash keyboard means, and to actuate the display switching means to connect it to the first register means to display the item prices entered and then to the second register means to display the subtotal thereof and the total of this subtotal plus tax and to the cash keyboard to display the cash tendered and to the first register means to display the difference between the cash tendered and said total.

6. In a system as set forth in claim 5, a change dispenser having a decade of inputs in a cents digit and in a dimes digit, and said inputs being connected by said programming means respectively with corresponding decade positions of the first register means after the cash keyboard means has been actuated;

and said change dispenser having command means connected with said programming means and enabled in the last step thereof.

7. In a system as set forth in claim 6, means for resetting the second register means and the programming means and connected to the last step of the programming means to operate when the change dispenser is actuated.

8. A register system comprising a gated source of pulses;

pulse counter means connected thereto and having a reset terminal and having decade outputs sequentially energized by the pulses counted;

two separate register means both accumulating in plural decade digits the pulses counted by the counter means and each register means having a reset terminal;

keyboard means including switch means having decade positions in each digit and connected to receive pulses sequentially in each decade position from the respective decade outputs of the pulse counter means in search of a decade position to which the switch means is set;

a digit keyboard gate corresponding with each digit of the keyboard switch means and each connected therewith to be energized when a selected decade position of the switch means is pulsed;

a register gate connected between each corresponding digit of both register means and said pulse source;

cyclic program means having sequentially appearing output voltages corresponding with each digit and respectively connected to progressively enable the digit gates and the register gates in one digit at a time and having an output connected to enable said gated source, and each digit gate having an output present when it is energized at its inputs, its output being connected to block the gated source and to reset the pulse counter and to advance the program means to enable the next digit;

reset means connected with the reset terminal of one of the register means and actuated when any of keyboard means is operated to reset one register to zero;

a display unit;

and switches for connecting said one of the register means to the display unit to display the individual keyboard entries thereon as they are made and then for connecting the other register means to the display unit to display the total of said entries.

9. A register system comprising a source of pulses;

first and second register means each having a plurality of digits;

means including keyboard means for entering the prices of various items into both register means and having means for counting successive trains of pulses thereinto, one digit at a time each train representing a different digit in a price and the number of pulses representing the decade value of that digit as selected by the keyboard means;

reset means connected with the first of the register means and actuated whenever a keyboard means is operated for entering a price;

display means normally connected to the first register means to display the prices as they are entered;

relay means, when actuated connecting the display means to the second of the register means to display the cumulative amount therein;

tax computer means connected with the second register means and when actuated determining the tax on the subtotal amount accumulated therein;

means connected with the pulse source including gates for entering into both register means pulses representing the amount of said tax to thereby enter the tax for display in the first register means and to simultaneously add the tax to the subtotal accumulated in the second register;

and program means having a sequential cycle which can be initiated from the keyboard after entries are completed, and connected to actuate the relay means to display the subtotal contained in the second register means, then to actuate the tax computer means and the counting means and release the relay means to display the tax in the first register means, and then to actuate the relay means to display the total of the subtotal plus tax contained in the second register means.

10. A register system comprising a source of pulses;

first and second register means each having a plurality of digits;

means including keyboard means for entering the prices of various items into both register means and having means for counting successive trains of pulses thereinto, each train representing a different digit in a price and the number of pulses representing the decade value of that digit as selected by the keyboard means;

reset means connected with the first of the register means and actuated whenever a keyboard means is operated for entering a price;

display means normally connected with the first register means to display the prices as they are entered;

relay means, when actuated connecting the display means to the second of the register means to display the cumulative amount therein;

tax computer means connected with the second register means and when actuated determining the tax on the subtotal amount accumulated therein;

means connected with the pulse source including gates for entering into both register means pulses representing the amount of said tax to thereby enter the tax for display in the first register and add the tax to the subtotal in the second register;

cash-tendered keyboard means having each key connected with the corresponding decade position in the corresponding digit of the second register means, means for entering pulses from said source into both register means for counting them up until the second register means reads the same as the cash keyboard means;

and program means having a sequential cycle which can be initiated from the keyboard after entries are completed, and connected to actuate the relay means to display the subtotal contained in the second register means, then to actuate the tax computer means and the counting means and release the relay means to display the tax in the first register means, then to actuate the relay means to display the total of the subtotal plus tax contained in the second register means, and then to release the relay means, reset the first counter means and enable the register counting means to count up the register means to bring the second register up to read the same as the cash keyboard means whereupon the first register means will read the amount of change due and display this amount.

11. A register system comprising a gated source of pulses;

first and second register means each having a pulse input to actuate each of a plurality of digits and each digit having a decade of outputs;

means including keyboard means for entering the prices of various items into the register means one digit at a time;

gate means for controlling the flow of pulses from the source into the digits of the register means;

first program means having sequentially enabled output voltages corresponding with each digit and respectively connected to enable the keyboard means and the gate means to pass trains of pulses in one digit at a time, each train representing a different digit in a price and the number of pulses representing the decade value of that digit as selected by the keyboard means, and the first program means having an output connected to control said gated source;

reset means connected with the first of the register means and actuated whenever a keyboard means is operated to enter a price;

display means normally connected to the first register means to display the prices as they are entered;

relay means, when actuated connecting the display means to the second of the register means to display the cumulative amount therein;

tax computer means including decade tax gates each having two inputs, one input of each gate being connected with said first program means to be sequentially energized thereby, tax-break gates connected to be selectively enabled by the outputs of the second register digits and these gates having their outputs coupled to the other inputs of said decade tax gates to selectively enable the latter, and tax computer program means for sequentially enabling the tax-break gates in successive digits and for enabling the gated source to count pulses into the decade tax gates in numbers determined by which tax-break gates are energized and to deliver a like number of pulses to both register means;

and second program means having a sequential cycle which can be initiated from the keyboard after entries are completed, and connected to actuate the relay means to display the subtotal contained in the second register means, then to actuate the tax computer means and release the relay means to display the tax in the first register means, and then to actuate the relay means to display the total of the subtotal plus tax contained in the second register means.

12. A multiple-item cash sales control system comprising a gated source of pulses;

a cyclic pulse counter connected to be stepped by said pulses to deliver in sequence a decade of outputs, and having a reset terminal;

plural groups of item pricing switches each representing one digit and having a wiper adjustable to one of the decade of switch positions, all corresponding positions of all of the switches being connected in parallel and with the corresponding decade outputs of said counter;

first and second registers each including in each of its digits a decade counter ring;

a digit gate corresponding with each digit of the pricing switches and connected to the wipers in that digit, and having an output;

an item keyboard having a key for selecting each item and each key having switch means for connecting the respective wipers of the switches in the group representing that item with the respective digit gates and for enabling said gated source when a key is operated;

cyclic program means having sequential output voltages connected to enable one digit gate at a time so that when the counter applies a decade output to the decade position of a pricing switch connected by its wiper and its key to an enabled digit gate the latter will have an output connected to the counter to reset it and connected to the gated source to block it and connected to the program means to advance it to enable the next digit gate;

a register gate for each digit of the registers and each having an output connected to advance both registers in that digit, the register gates being connected to the gated source to receive the same number of pulses delivered by it to the pulse counter, and the register gates being respectively connected to the sequential output voltages of the program means to be enabled thereby in each digit one at a time to pass the counted pulses into the corresponding digit of the registers;

and register reset means connected to the keyboard and actuated thereby to reset the first register each time an item key is actuated, whereby this register will read each item price as a key is operated and the second register will accumulate successive item prices.

13. A multiple-item cash sales control system comprising a gated source of pulses;

a cyclic pulse counter connected to be stepped by said pulses to deliver in sequence a decade of outputs, and having a reset terminal;

plural groups of item pricing switches each representing one digit and having a wiper adjustable to one of a decade of switch positions, all corresponding positions of all of the switches being connected in parallel and with the corresponding decade outputs of said counter;

first and second registers each including in each of its digits a decade counter ring;

a digit gate corresponding with each digit of the pricing switches and connected to the wipers in that digit, and having an output;

an item keyboard having a key for selecting each item and each key having switch means for connecting the respective wipers of the switches in the group representing that item with the respective digit gates and for enabling said gated source when a key is operated;

cyclic program means having sequential output voltages connected to enable one digit gate at a time so that when the counter applies a decade output to the decade position of a pricing switch connected by its wiper and its key to an enabled digit gate the latter will have an output connected to the counter to reset it and connected to the gated source to block it and connected to the program means to advance it to enable the next digit gate;

a register gate for each digit of the registers and each having an output connected to advance both registers in that digit, the register gates being connected to the gated source to receive the same number of pulses delivered by it to the pulse counter, and the register gates being respectively connected to the sequential output voltages of the program means to be enabled thereby in each digit one at a time to pass the counted pulses into the corresponding digit of the registers;

reset means to be actuated when a key is operated and when all of the item prices have been entered, and connected to reset the first register to zero;

tax computer means actuated by a key when all of the item prices have been entered and comprising decade tax gates each having one input connected to a corresponding output of the pulse counter to be successively enabled thereby, plural tax-break gates connected with the outputs of the second register and having outputs connected with the other inputs to the decade tax gates, and the latter having outputs connected through the digit gates to control the gated source;

and program means for enabling the gated source when the tax computer is actuated to start said pulse counter counting, the latter sequentially enabling the decade gates and the registers enabling the tax-break gates, and said pulse source delivering a like number of pulses to said register gates to enter the tax in the first register and add the tax to the subtotal accumulated in the second register.

14. A multiple-item cash sales control system comprising a gated source of pulses;

a cyclic pulse counter connected to be stepped by said pulses to deliver in sequence a decade of outputs, and having a reset terminal;

plural groups of item pricing switches each representing one digit and having a wiper adjustable to one of a decade of switch positions, all corresponding positions of all of the switches being connected in parallel and with the corresponding decade outputs of said counters;

first and second registers each including in each of its digits a decade counter ring;

a digit gate corresponding with each digit of the pricing switches and connected to the wipers in that digit, and having an output;

an item keyboard having switch means for connecting the respective wipers of the switches in the group representing that item with the respective digit gates and for enabling said gated source when a switch means is operated;

cyclic program means having sequential output voltages connected to enable one digit gate at a time so that when the counter applies a decade output to the decade position of a pricing switch connected by its wiper and its key to an enabled digit gate the latter will have an output connected to the counter to reset it and connected to the gated source to block it and connected to the program means to advance it to enable the next digit gate;

a register gate for each digit of the registers and each having an output connected to advance both registers in that digit, the register gates being connected to the gated source to receive the same number of pulses delivered by it to the pulse counter, and the register gates being respectively connected to the sequential output voltages of the program means to be enabled thereby in each digit one at a time to pass the counted pulses into the corresponding digit of the registers;

reset means to be actuated when all of the item prices have been entered and connected to reset the first register to zero;

a cash keyboard including a separate switch for each output of the second register and each switch being connected between that output and the associated digit gate, the switches being selectively closed by operation of the cash keyboard when entering the amount of cash tendered thereon;

and means for enabling the gated source to start said pulse counter counting and deliver pulses to both registers, the pulses delivered to the second register passing therethrough in output positions corresponding with closed switches of the cash keyboard and actuating the associated digit gate to advance said program means to the next higher digit until the second register is counted up to read the same as the cash keyboard, the first register then reading the difference between the subtotal of the item prices and the cash tendered.

References Cited by the Examiner

UNITED STATES PATENTS

| | | | |
|---|---|---|---|
| 2,404,739 | 7/1946 | Mumma | 235—173 |
| 2,528,100 | 10/1950 | Williams | 235—160 |
| 2,572,699 | 10/1951 | Carpenter et al. | 235—173 |
| 2,575,331 | 10/1951 | Compton et al. | 235—160 |
| 2,595,045 | 4/1952 | Desch et al. | 235—173 |

ROBERT C. BAILEY, *Primary Examiner.*

MALCOLM A. MORRISON, *Examiner.*

M. A. LERNER, *Assistant Examiner.*